F. A. YOUNG.
TYPE WRITING MACHINE.
APPLICATION FILED MAY 22, 1909.
957,294.
Patented May 10, 1910.
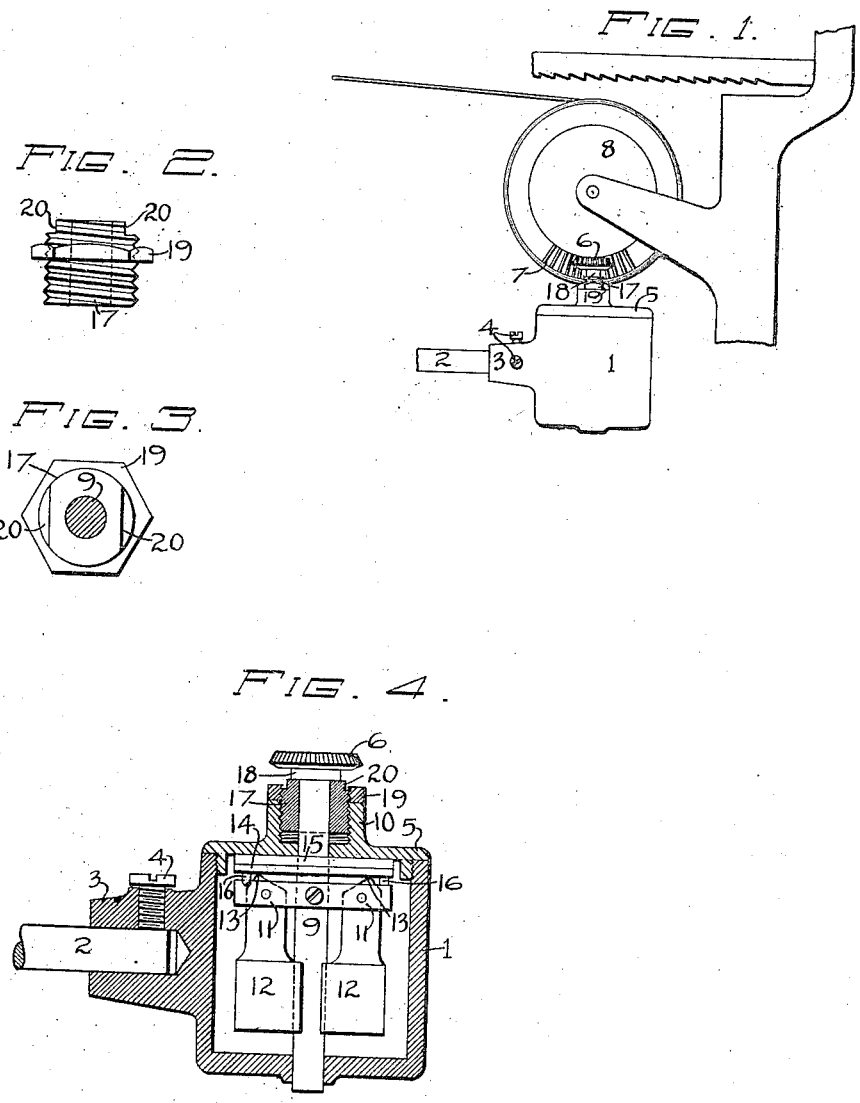
WITNESSES:
John O. Seifert
Neil M. Macdonald
INVENTOR:
Frank A. Young
BY B. C. Stickney,
ATTORNEY

UNITED STATES PATENT OFFICE.

FRANK A. YOUNG, OF NEW YORK, N. Y., ASSIGNOR TO UNDERWOOD TYPEWRITER COMPANY, OF NEW YORK, N. Y., A CORPORATION OF NEW JERSEY.

TYPE-WRITING MACHINE.

957,294.

Specification of Letters Patent.  Patented May 10, 1910.

Application filed May 22, 1909.  Serial No. 497,607.

*To all whom it may concern:*

Be it known that I, FRANK A. YOUNG, a citizen of the United States, residing in New York, in the county of New York and State of New York, have invented certain new and useful Improvements in Type-Writing Machines, of which the following is a specification.

This invention relates to improvements in speed governors for the power driven carriages of typewriting and tabulating machines.

Heretofore the adjustment of the brake members necessitated the disassembling of the speed governor to allow access of the interior thereof.

The object of the invention is to provide means whereby a simple and expeditious adjustment of the brake members may be effected.

By the present invention the adjustment is effected from the exterior of the speed governor, without disassembling any part. A bushing is threaded into the governor casing, to adjust a spindle upon which certain of said brake members are attached, to raise and lower said spindle. Provision is also made for locking the bushing.

In the accompanying drawings, Figure 1 is an elevation of a speed governor with the present improvements applied thereto. Fig. 2 shows in elevation the adjustable bushing and its lock nut. Fig. 3 is a plan corresponding to Fig. 2. Fig. 4 is a sectional view of the improvements.

The usual casing 1 is secured on the rock shaft 2 by means of hub 3 and screws 4, and has the usual threaded cap 5, formed with a hub 10, from which protrudes a bevel pinion 6, adapted, when the shaft 2 is rocked, to be thrust into mesh with a bevel gear 7 on the rear face of a carriage driving spring barrel 8, so that the pinion is rotated by the barrel as the latter draws the carriage along. The pinion is fixed upon the upper end of the spindle 9 which is journaled in the top and bottom of the casing 1.

Attached to the spindle 9 within the casing, is the usual head 11 to which is pivoted a pair of weights 12, adapted to swing outwardly when rotated by the spindle. Cams or projections 13 upon the revolving weights, are caused by the latter to press up against the under side of a plate 14, which is loose upon the spindle 9, to force said plate up against a loose friction washer 15, to retard the speed of the spindle. The plate 14 is caused to revolve by the projections 16 thereon which engage the head 11, as set forth in the prior application of John C. McLaughlin No. 403,891, filed November 26, 1907. To effect fine adjustment of the cams 13 relatively to the plate 4, a bushing 17, surrounding the spindle 9, is threaded into the hub 10 on the cap 5, to be adjustable in the direction of the axis of the spindle. The bushing supports the hub 18 of the pinion, so that any up or down movement of the bushing adjusts the spindle and the cams 13. A nut 19 locks the bushing after its adjustment. Flats 20 may be formed on two opposite sides of the bushing 17 for engagement with a suitable key.

Having thus described my invention, I claim:

1. In a speed governor for the power-driven carriage of a typewriting and tabulating machine, the combination with a casing, a spindle mounted in said casing, a pinion on said spindle to engage a part connected to the carriage, a friction plate, an opposing member, a head operated by said spindle, and a weight pivoted to said head and having a cam device operated by the weight to engage said plate to force it against said opposing member, of adjustable means extending to the exterior of the casing to effect relative adjustment between the friction plate and the cam device, in the direction of the axis of said spindle.

2. In a speed governor for the power-driven carriage of a typewriting and tabulating machine, the combination with a casing, a spindle mounted in said casing, a pinion on said spindle to engage a part connected to the carriage, a friction plate, an opposing member, a head operated by said spindle, and a weight pivoted to said head and having a cam device operated by the weight to engage said plate to force it against said opposing member, of adjustable means extending to the exterior of the casing to effect relative adjustment between the friction plate and the cam device, in the direction of the axis of said spindle, and means at the exterior of the casing to lock said adjustable means.

3. In a speed governor for the power-driven carriage of a typewriting and tabulating machine, the combination with a casing, a spindle mounted in said casing, a pinion on said spindle to engage a part connected to the carriage, a friction plate, an opposing member, a revoluble head, and a weight pivoted to said head and having a cam device operated by the weight to engage said plate to force it against said opposing member, of adjustable means extending to the exterior of the casing to effect relative adjustment between the friction plate and the cam device, in the direction of the axis of said spindle, said head fixed to said spindle.

4. In a speed governor for the power-driven carriage of a typewriting machine, the combination with a casing, a spindle mounted therein and having a pinion connected to the carriage, a friction plate, an opposing member, a head secured upon said spindle, and a weight pivoted to said head having a cam part to force said plate against said opposing member, of a member threaded into the casing, to raise and lower said spindle, to effect adjustment between the cam device and the friction plate, in the direction of the axis of said spindle.

5. In a speed governor for the power-driven carriage of a typewriting machine, the combination with a casing, a spindle mounted therein and having a pinion to engage a part connected to the carriage, a friction plate, an opposing member, a head secured upon said spindle, and a weight pivoted to said head and having a part to force said plate against said opposing member, of a bushing surrounding the spindle and threaded into the casing to raise and lower the spindle.

6. In a speed governor for the power-driven carriage of a typewriting machine, the combination with a casing, a spindle mounted therein and having a pinion to engage a part connected to the carriage, a friction plate, an opposing member, a head secured upon said spindle, and a weight pivoted to said head and having a part to force said plate against said opposing member, of a bushing surrounding the spindle and threaded into the casing to raise and lower the spindle, and a nut to lock the bushing.

FRANK A. YOUNG.

Witnesses:
 JOHN O. SEIFERT,
 K. FRANKFORT.